United States Patent
Mani et al.

(10) Patent No.: US 9,753,713 B2
(45) Date of Patent: Sep. 5, 2017

(54) COORDINATED UPGRADES IN DISTRIBUTED SYSTEMS

(75) Inventors: Ajay Mani, Woodinville, WA (US); Pavel Dournov, Sammamish, WA (US); Luis Irun-Briz, Sammamish, WA (US); Pavithra Nagesharao, Redmond, WA (US); Haizhi Xu, Bellevue, WA (US); Akram Hassan, Sammamish, WA (US); Ashish Shah, Sammamish, WA (US); Todd Pfleiger, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1292 days.

(21) Appl. No.: 12/910,712

(22) Filed: Oct. 22, 2010

(65) Prior Publication Data
US 2012/0102481 A1    Apr. 26, 2012

(51) Int. Cl.
G06F 9/445    (2006.01)
G06F 11/07    (2006.01)
G06F 9/455    (2006.01)

(52) U.S. Cl.
CPC ............ *G06F 8/65* (2013.01); *G06F 9/45504* (2013.01); *G06F 11/0757* (2013.01)

(58) Field of Classification Search
CPC ....... H04L 29/08981; G06F 8/65; G06F 8/61; G06F 8/67; G06F 8/60
USPC ........................................................ 717/172
See application file for complete search history.

(56) References Cited

U.S. PATENT DOCUMENTS

| | | | |
|---|---|---|---|
| 6,405,219 | B2 | 6/2002 | Saether et al. |
| 7,257,689 | B1 * | 8/2007 | Baird ............................. 711/162 |
| 7,360,208 | B2 | 4/2008 | Joshi et al. |
| 2003/0135384 | A1 | 7/2003 | Nguyen |
| 2004/0003266 | A1 * | 1/2004 | Moshir et al. ................ 713/191 |
| 2005/0267951 | A1 * | 12/2005 | Joshi et al. ................... 709/220 |
| 2006/0130046 | A1 * | 6/2006 | O'Neill ......................... 717/168 |
| 2006/0294413 | A1 * | 12/2006 | Filz et al. .......................... 714/4 |
| 2007/0100957 | A1 | 5/2007 | Bhogal et al. |
| 2008/0222164 | A1 * | 9/2008 | Bhogal et al. .................. 707/10 |
| 2008/0271017 | A1 * | 10/2008 | Herington ......................... 718/1 |
| 2009/0007135 | A1 | 1/2009 | Rathunde et al. |
| 2009/0119655 | A1 | 5/2009 | Quilty |

(Continued)

OTHER PUBLICATIONS

"Windows Azure Service Life Cycle", Retrieved at << http://it-tutorials.us/os/3352.aspx >>, Oct. 10, 2010, pp. 3.

(Continued)

*Primary Examiner* — Li B Zhen
(74) *Attorney, Agent, or Firm* — Lempia Summerfield Katz LLC

(57) ABSTRACT

A distributed application may be updated by using information provided by the application to determine grouping, sequencing, and whether or not to advance an update sequence. The application may provide input to an update sequence, and may cause the update sequence to repair one or more replicas prior to updating. The update mechanism may be used to change the distributed application topology as well as make changes to the application executable code, application configuration, quest operating system, virtual machine, and host systems, among others. In some cases, the distributed application may use a quorum to determine which version is current, and the quorum may change during the update process.

20 Claims, 4 Drawing Sheets

(56) References Cited

U.S. PATENT DOCUMENTS

2010/0058318 A1* 3/2010 Bernabeu-Auban et al. 717/172
2010/0106767 A1 4/2010 Livshits et al.

OTHER PUBLICATIONS

"Windows Azure", Retrieved at << http://www.azurepilot.com/page/Windows+Azure%3A+Fabric+Controller >>, retrieved date: Oct. 18, 2010, pp. 3.

Solarski, et al., "Dynamic Upgrade of Distributed Software Components", Retrieved at << http://citeseerx.ist.psu.edu/viewdoc/download?doi=10.1.1.86.6942&rep=rep1&type=pdf >>, Jan. 26, 2004, pp. 191.

"Appendix A: Updating a Windows Azure Service", Retrieved at << http://msdn.microsoft.com/en-us/library/ff966479.aspx >>, retrieved date: Oct. 18, 2010, pp. 6.

"International Search Report", Mailed Date: Apr. 24, 2012, Application No. PCT/US2011/053528, Filed Date: Sep. 27, 2011, pp. 8.

European Search Report in European patent application No. EP 11 83 4821, dated Mar. 24, 2014, 6 pages.

First Office Action in Chinese Patent Application No. 201110340264.8, dated Jul. 31, 2014, 11 pages.

"Office Action Issued in European Patent Application No. 11834821.8", Mailed Date: Apr. 4, 2016, 3 Pages.

* cited by examiner

COORDINATED UPGRADES IN DISTRIBUTED SYSTEMS

BACKGROUND

Distributed systems may have multiple copies of an application executable code executing in separate processes. In some embodiments, the various instances of the application may be operating on different hardware platforms. In many cases, a load balancing system may be used to distribute the workload across each instance of the application.

Distributed applications are often used in situations where a high degree of scalability may be useful. For example, a website or web application may be scaled the multiple processes when a large surge in traffic may be expected. In such situations, an application may be duplicated into many hundreds or thousands of instances, each operating in parallel.

SUMMARY

A distributed application may be updated by using information provided by the application to determine grouping, sequencing, and whether or not to advance an update sequence. The application may provide input to an update sequence, and may cause the update sequence to repair one or more replicas prior to updating. The update mechanism may be used to change the distributed application topology as well as make changes to the application executable code, application configuration, quest operating system, virtual machine, and host systems, among others. In some cases, the distributed application may use a quorum to determine which version is current, and the quorum may change during the update process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
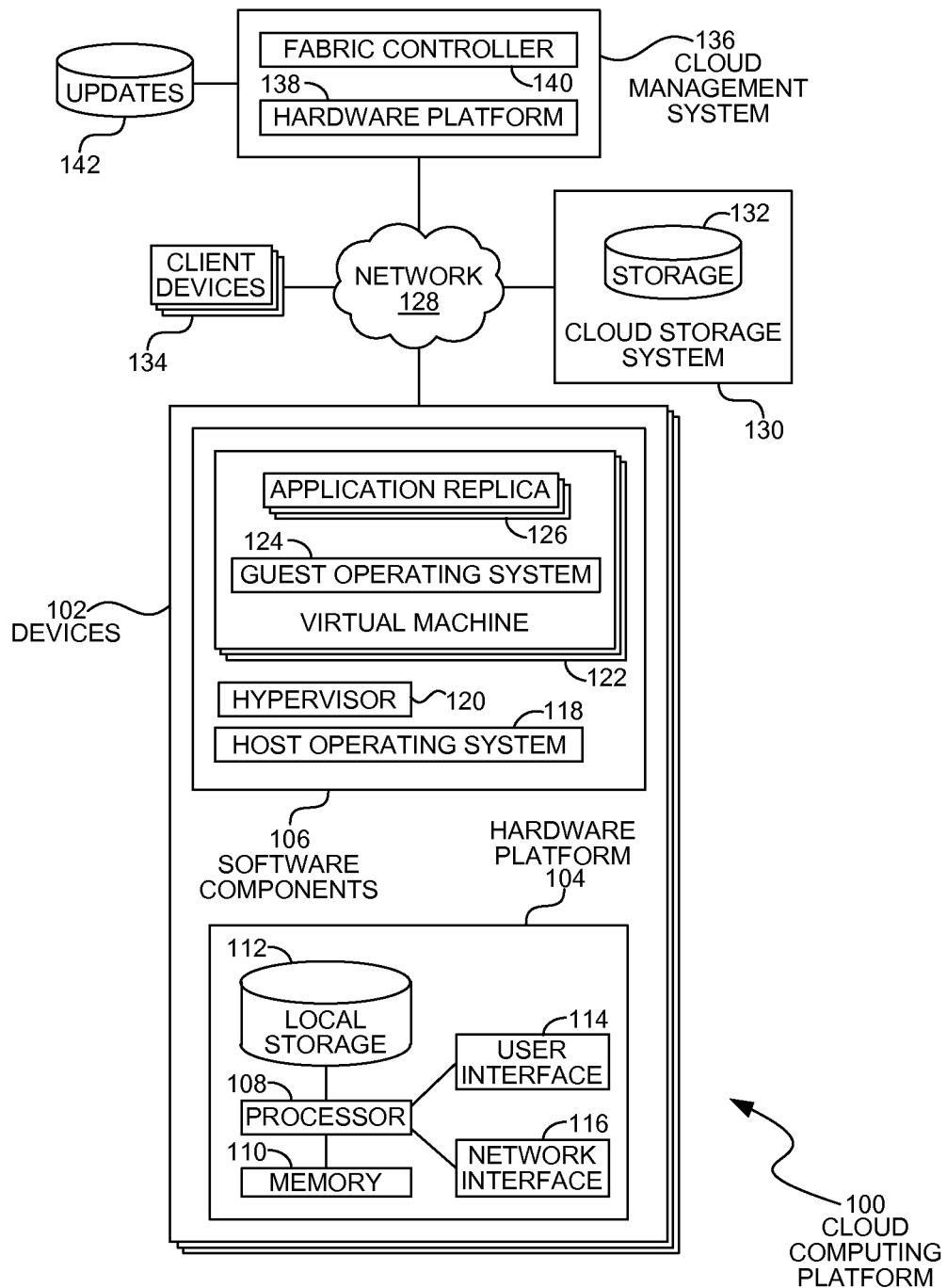
FIG. 1 is a diagram illustration of an embodiment showing a cloud computing environment and platform.

A distributed application may be updated by using input from the application to determine how to perform an update, when the update may proceed, as well as to determine whether a problem may have occurred during the update. The application may operate with a quorum to determine which version of the application is current, and the current version may change as the update progresses.

The update mechanism may allow a distributed application to be highly available during the update process. The updates may be performed on groups of replicas of the application, so that when one group is being updated, the other groups may remain operational.

The groups may be defined as update domains. Within an update domain, a set of application processes may be updated as an atomic operation. If the update is not successful for each process within the update domain, the update may be suspended or rolled back to the previous version.

The update mechanism may allow updates to be performed on the application itself, which may include changing the application configuration as well as updating the application executable code. The update mechanism may also be used to perform updates on a host device, a virtual machine, a guest operating system within the virtual machine, as well as updating the topology of the application replicas.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a cloud computing system with a system for upgrading distributed applications. Embodiment 100 is a simplified example of a cloud computing platform and environment in which a distributed application may be upgraded while keeping a high availability.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a cloud computing environment where applications may be executed by using many replicas of an application process. The replicas may be identical copies of the same executable code and having the same configuration. When performing an update to the system, the application may have minimal or no downtime. In some cases, the application may experience somewhat lower capacity, but the application may continue to be available during the update.

The update process may be used by a cloud services administrator to apply changes to the cloud services infrastructure, and the same update process may be used by an application owner to perform updates on the application.

In some cloud computing environments, a cloud service provider may manage the underlying hardware and provide some software services, such as an operating system to the application. In such embodiments, the cloud service provider may periodically update the host hardware and software, as well as software executing on various virtual machines on which the application may execute.

For example, an application may execute on a guest operating system in a virtual machine. The application owner or administrator may configure the cloud service provider for the guest operating system to implement all security updates as the updates are available. In such an example, the application may have updates applied on a weekly, daily, or even hourly in some cases.

In some cases, an application owner or administrator may also apply updates to the application. The updates may be configuration changes to the application, or may involve updating the executable code for the application. In some cases, the application topology may change, by either adding or removing replicas of the application process.

When an update may be performed, the application processes may be grouped together into update domains. Each update domain may be a group of processes which may be updated at the same time and in an atomic fashion. The groupings may be determined by the application, as opposed to having an external update mechanism determine the groupings.

When the application determines the groupings, the application can use the application topology or other information within the application to assist an external update mechanism to determine an appropriate set of update domains and the sequence of update domains that may be updated. In many embodiments, the application may be more aware of pertinent information which may be useful in organizing and managing updates than external sources.

For example, the application may be aware of all of the replicas or instances of the application process. An update to host devices, such as upgrading the host device operating system, may be performed by grouping the application processes according to the host device on which the process executes. In another example, the application may group replicas based on their workload. In such an example, groups of application processes with low workload may be grouped together and updated first, while applications processes with higher workloads may be grouped together and updated later.

In some embodiments, the application may be a quorum based application, where several application processes may operate in parallel and then 'vote' or achieve consensus by comparing results from several processes. In such embodiments, the determination of a current version may be determined by quorum, and only those processes operating on the current version may be considered valid. Processes that may execute an older version may be ignored or may not operate until they are updated.

Embodiment 100 illustrates devices 102 that may make up a cloud computing environment. In many cloud computing environments, multiple hardware platforms may be organized together to provide large amounts of computing power for certain applications. In many embodiments, a datacenter may contain many thousands of computers, such as server computers, and may have various management tools that may provision the computers for operating different applications.

In many such embodiments, the management tools may provision resources for various tenants. Each tenant may contract with a cloud computing service provider to host one or more applications. The tenant's resources may be isolated from other tenant's resources so that neither tenant may have access to the other's data or executable code.

The devices 102 may be conventional computer devices, such as personal computers or server computers, and may have a hardware platform 104 and various software components 106. The hardware platform 104 may include a processor 108, random access memory 110, and local storage 112.

In some embodiments, the processor 108 may have one or more processors or cores. In some cases, a single processor 108 may have two, four, eight, sixteen, or other number of cores, and some hardware platforms may have two or more processors 108.

The random access memory 110 may be volatile memory and may be high speed memory that may be directly accessed by the processor 108. The local storage 112 may be non-volatile memory that may also be accessed by the processor 108, but in many cases may be slower than the random access memory 110.

The local storage 112 may or may not be accessible by a tenant process. In many embodiments, the local storage 112 may be used for temporary storage of tenant data while an application may be executing, while permanent or long term storage may be provided by a cloud storage system 130.

The hardware platform 104 may include a user interface 114 and a network interface 116. The user interface 114 may be a physical user interface, which may include a keyboard, display, and pointing device. In some embodiments, the user interface may be transmitted to another device located remotely. The network interface 116 may be any type of connection to any type of network. In a conventional datacenter, the network interface 116 may be a wired Ethernet connection.

The software components 106 may include a host operating system 118 and a hypervisor 120. In some embodiments, the hypervisor 120 may execute natively on the hardware platform 104 without the use of a separate operating system 118.

The hypervisor 120 may allow one or more virtual machines 122 to execute on the hardware platform 104. Each virtual machine 122 may be a software emulation of a physical hardware platform 104, and may operate separately and independently of other virtual machines. In many embodiments, a single hardware platform may execute several virtual machines in parallel. In many embodiments, the virtual machines 122 may be a logical division between different tenants within the datacenter, where each tenant's processes may execute on virtual machines dedicated to that tenant.

Within each virtual machine 122, a guest operating system 124 may execute. The term "guest" operating system refers to a virtual machine's operating system, in contrast to a "host" operating system. In many embodiments, the guest operating system 124 may be different from the host operating system 118. In such embodiments, a single hardware platform 104 may have many different guest operating systems executing in parallel.

The application replicas 126 may execute within the virtual machine 122. In some embodiments, a single application replica 126 may execute within a single virtual machine 122, while in other embodiments, more than one application replica 126 may execute in a single virtual machine.

The cloud platform may be connected to a network 128, which may be a local area network, wide area network, and may include the Internet. A cloud storage system 130 may have a large storage 132 that may be accessed by the various virtual machines 122 and the application replicas 126.

Many applications may be accessed through various client devices 134. The client devices 134 may be any type of computing device that may access the application over a network 128. The client devices 134 may be personal computers, hand held personal digital assistants, mobile telephones, server computers, network appliances, game consoles, or any other type of computing device.

A cloud management system 136 may perform many of the management functions for the cloud computing environment and for the applications executing within the environment. The cloud management system 136 may have a hardware platform 138 on which a fabric controller 140 may execute. In many embodiments, the hardware platform 138 may be the cloud computing environment of the devices 102.

The fabric controller 140 may be an application that may perform various management functions for the cloud computing environment. The management functions may include provisioning the cloud computing environment for individual tenants, adding or removing hardware platforms, managing the workloads within the cloud computing environment, and performing updates to the hardware, host operating systems, virtual machines, guest operating systems, and the applications.

As part of the update process, the fabric controller 140 may receive updates 142 from various sources, such as an application developer, operating system provider, security provider, or other source.

The fabric controller 140 may perform updates on the cloud computing environment by involving the application to determine how to group the application replicas and a sequence to process the groups.

Figure 2:
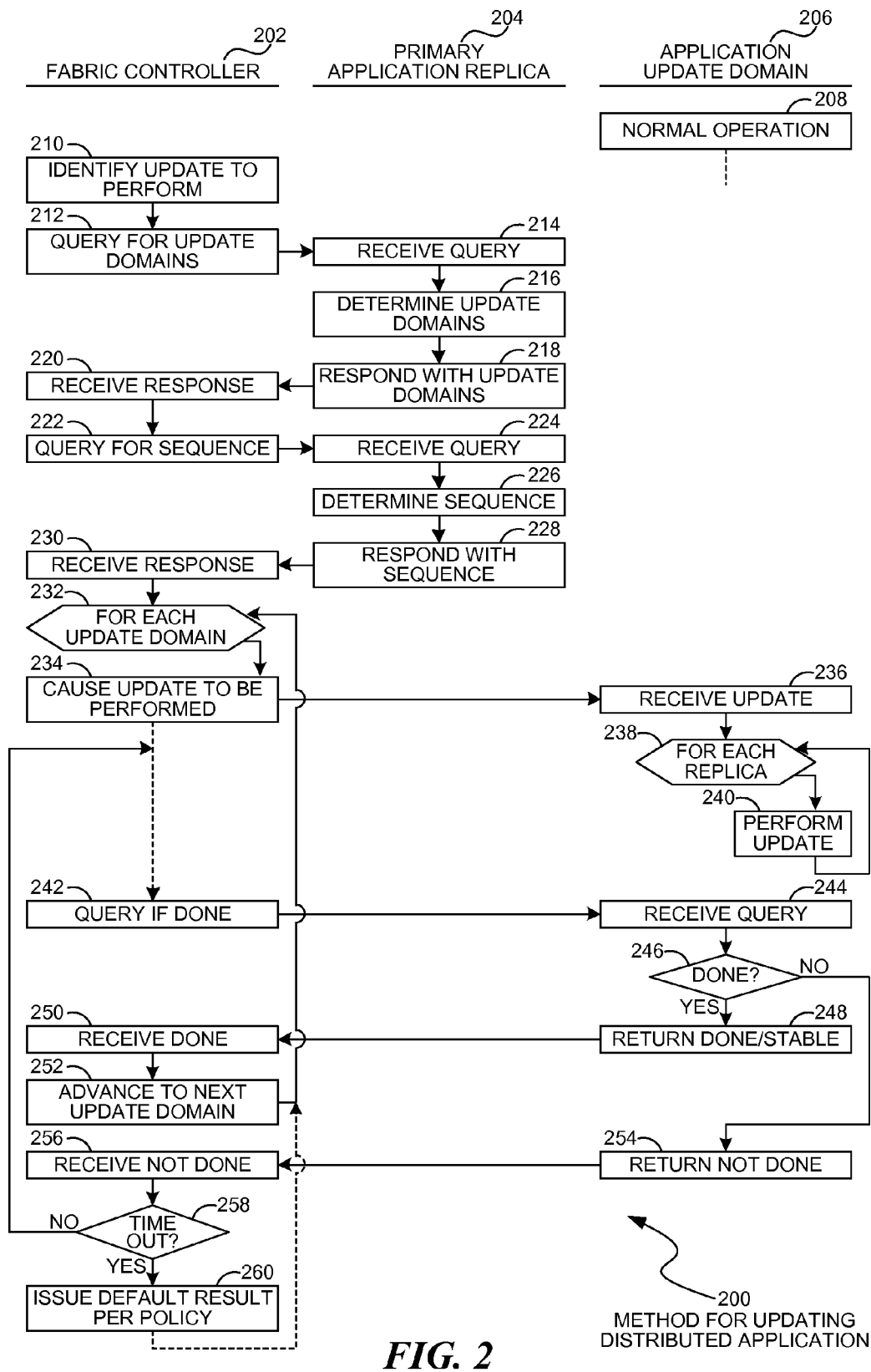
FIG. 2 is a timeline illustration of an embodiment showing a method for updating a distributed application.

FIG. 2 is a timeline illustration of an embodiment 200 showing a method for updating a distributed application. The process of embodiment 200 is a simplified example of how a fabric controller 202 may interact with a primary application replica 204 and a group of application replicas organized into update domains 206. The operations of the fabric controller 202 are illustrated in the left hand column, while the operations of the primary application replica 204 are illustrated in the center column, and the operations of an update domain 206 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a portion of a method for performing an update to a distributed application. A distributed application may be any application that executes on multiple processes that are separate and independent. In many embodiments, a distributed application may execute on many different processes, sometimes numbering in the thousands or even hundreds of thousands of processes. Many distributed processes may operate identical executable code in identical configurations. Many such processes may be also operated in a stateless manner.

Because updating a large number of processes may be a very time consuming task, the application may be updated in groups of processes. Each group may be referred to as an update domain. While one update domain is being updated, other update domains may remain functioning.

The update method may use input from the application to determine how the processes may be grouped and in what sequence the groups or update domains may be updated. The input from the application may allow the application to determine an optimum update method. In some embodiments, the optimum update method may change based on the particular circumstances and the type of update being performed.

The method of embodiment 200 may be performed several times to accomplish an update. For example, a topology change may be performed in three steps. In a first step, an update step may open a specific port on various processes so that a new topology may be accessed. In the second step, the new topology may be implemented with new application replicas available on the new ports. In the third step, the old, unused ports of the old topology may be closed down.

In the topology example, the update method of embodiment 200 may be performed three times to accomplish an update. In some situations, the update process of embodiment 200 may be performed one, two, or more times to accomplish a change to the system.

The update method of embodiment 200 may be used to update the application by either updating the application configuration or the application executable code. The same update method may also be used to update various infrastructure components, such as updating host hardware, host software including the host operating system, virtual machine configuration, guest operating system, and other software components operable on the host or virtual machine. The update method may be used to update executable code as well as to reconfigure a hardware or software component without changing the executable code.

In block 208, the application may be operating in normal operation.

In block 210, the fabric controller 202 may identify an update to perform. The update may be defined by an application owner or tenant of a cloud computing service. In some cases, the update may be defined by an administrator of a cloud computing service. The update may be manually or automatically detected. In the case of a code update or change to an application, the update may be manually identified and started. In the case of a security update to an operating system, the update may be automatically identified by subscribing to a security update service from the operating system manufacturer.

Prior to performing the update, the fabric controller 202 may send a query in block 212 to a primary application replica 204.

The primary application replica 204 may be an application replica that may respond to administrative queries and may perform administrative functions for the application. In some embodiments, there may not be a specific replica that may be designated a primary replica. For the purposes of the present embodiment, the primary application replica 204 may refer to any administrative portion of an application.

The primary application replica 204 may receive the query in block 214 and may determine update domains in block 216. The update domains may be returned to the fabric controller 202 in block 218 and received in block 220. The fabric controller 202 may send a query for a sequence of update domains in block 222. The sequence query may be received in block 224 and determined in block 226. The update sequence may be returned in block 228 and received in block 230.

The update domains may be groups of application replicas on which an update may be performed. In some embodiments, the update domains may change based on the circumstances. For example, an update to the hardware may group the application replicas by the replicas operating on the same hardware platform.

In some embodiments, the update domains may contain the same number of application replicas, or may be approximately the same size such as within 10% of the number of application replicas of another update domain. In other embodiments, some update domains may be much larger than other, smaller update domains. Such embodiments may be useful when the hardware topology or datacenter topology may be vastly different from one hardware platform or datacenter to another.

In another example, an update may be performed on application replicas that are located in different datacenters located across a country or across the globe. In such a circumstance, the update domains may be defined such that those application replicas in the same datacenter may be updated together. Such a grouping may allow application replicas to be updated across an entire datacenter, then proceed to another datacenter.

Such a grouping may be sequenced so that datacenters having a light loading may be updated first. In many such situations, datacenters around the globe may have workloads that may vary with the time of day. By sequencing the update to be performed according to time zones, an update may performed with a minimum of disruption to the workloads.

In a similar example, an update performed across application replicas in different datacenters may be grouped such that each update domain may contain application replicas in two or more datacenters. Such a grouping may perform an update on some application replicas, but may leave at least some application replicas operating in each datacenter. In such a grouping, the sequence may be configured so that each datacenter may have at least some application processes executing during the update.

In some embodiments, the fabric controller 202 may transmit information about the update to the primary application replica 204 so that the application replica may determine an appropriate grouping and sequence for the update. The fabric controller 202 may indicate whether or not the update may be time consuming or quick, whether a restart of the application, guest operating system, or host operating system may be included, whether the update affects the application, virtual machine, or host device, or the fabric controller 202 may indicate other factors that may be considered by the primary application replica 204.

In some embodiments, an initial step in a multi-step update sequence may be to identify any update domains where an application replica may not be properly functioning and therefore may not be capable of being updated. In such a step, each update domain may be analyzed to determine whether or not the update domain contains application replicas that are suspended, not started, unresponsive, or otherwise have potential issues. After such a step may be performed, a repair process may be launched for the problem replicas to attempt to heal the replicas. In some cases, the healing may involve restarting the application process or guest operating system, or may involve moving the application replica to another hardware platform or perform other repair functions.

After such healing operations have been performed, the update sequence may advance to another step where actual changes to the system may be performed. In such an example, the step of healing application replicas may place the application replicas in a condition for updating prior to making changes to the application or the underlying hardware and software components.

Each update domain may be processed in block 232. For each update domain, the process of blocks 234-260 may be performed. After performing the process of blocks 234-260 for one update domain, the next update domain in sequence may be processed.

For each update domain in block 232, the update may be caused to be performed in block 234. Within the application domain 206, the update may be received in block 236 and for each replica in block 238, the update may be performed in block 240.

In some cases, the update may be performed by an application operating on the host or within the virtual machine. Some such updates may make modifications to the host or guest operating system, applications associated with the host or guest system, or may perform other changes that may or may not be associated with the application.

At some point, the fabric controller 202 may issue a query in block 242 to determine if the update is complete. The query may be received by the update domain 206 in block 244 and evaluated in block 246. If the update has been completed and the application operation may be stable, the update domain 206 may transmit the results in block 248, which may be received by the fabric controller 202 in block 250. If the results are stable, the process may return to block 232 to process the next update domain.

If the update domain has not successfully completed the update in block 246, the update domain 206 may transmit the results in block 254, which may be received by the fabric controller 202 in block 256. The fabric controller 202 may have a set of policies or other logic that may allow for a timeout operation. If the timeout has not occurred in block 258, the process may return to block 242 to perform another status query. If the timeout has occurred in block 258, the fabric controller 202 may issue a default result per a policy definition in block 260.

The default result of block 260 may depend on the circumstances. For example, if the update was making changes to the host hardware or software, the application state may be ignored and the next update domain may be processed. In such an example, the input from the application may be irrelevant to determining if the update was a success or not.

In another example, if the update was installing new executable code for the application and the application did not indicate that the application code was operating in a stable fashion, the update operation may be suspended and a human administrator may be alerted. In another embodiment, such a result may log the conditions and may automatically attempt to revert the application code to a previous version.

Embodiment 200 illustrates several interactions between a fabric controller 202 and an application during an update process. The interactions may allow input or hints from the application to influence how a management system may implement and verify an update. The feedback and input from the application may allow a more efficient update process and one in which the performance of the application can be verified as the update takes place. Further, the update may be implemented in stages by applying the update to groups of application replicas, thereby allowing other application replicas to remain operational during the update.

Figure 3:
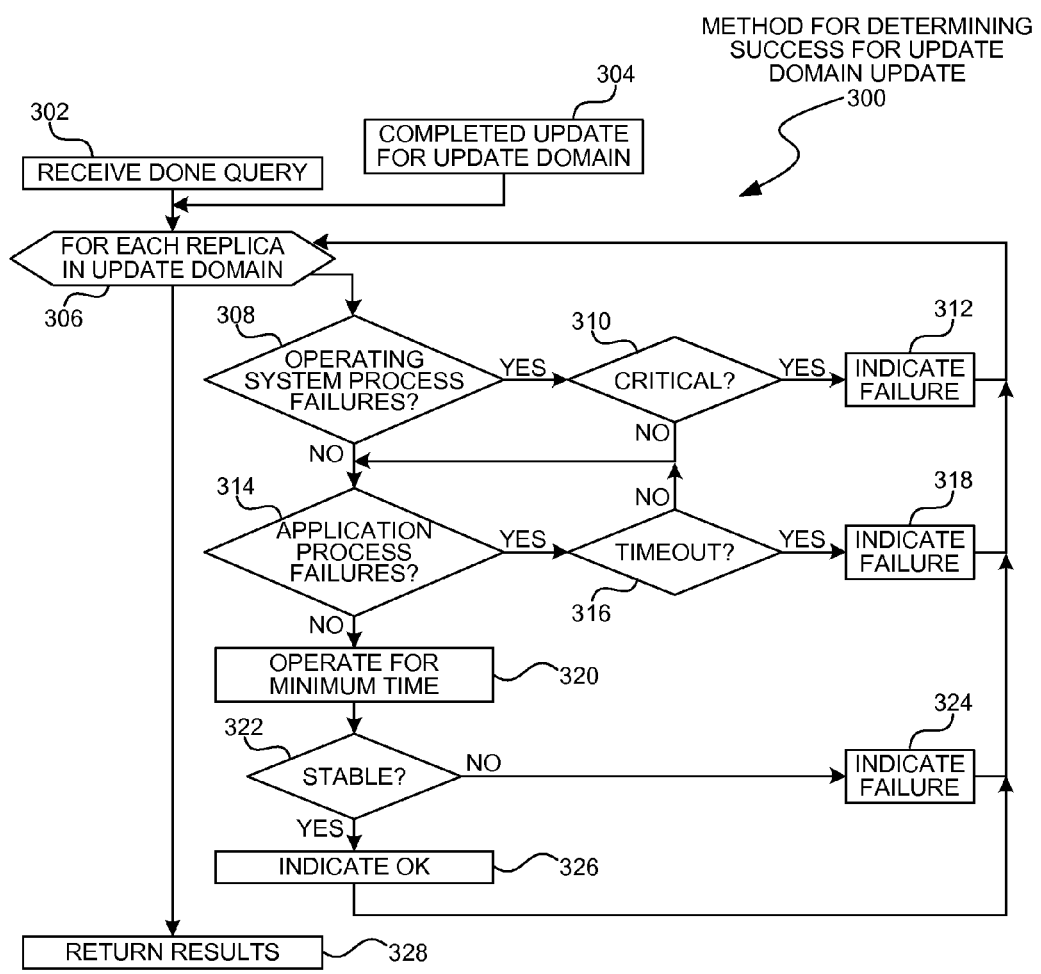
FIG. 3 is a flowchart illustration of an embodiment showing a method for determining success for an update domain update.

FIG. 3 is a flowchart illustration of an embodiment 300 showing a method for an application update domain to determine if an update was a success or failure. The process of embodiment 300 may be performed during blocks 244 through 246 of embodiment 200, for example.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 may be executed in two different situations. In a first situation, a query may be received in block 302 from a fabric controller requesting a status from an update. In another situation, the update may have been completed for an update domain in block 304.

In either case, the operational characteristics of the application and its environment may be evaluated to determine whether or not the update may have been successful.

Each application replica may be evaluated in block 306 for the update domain. For each replica, the operating system processes may be evaluated in block 308 for any failures. If failures are present in block 308, the critical nature of the failures may be evaluated in block 310. If the failures are critical in block 310, the update to the replica may be labeled as a failure in block 312. If the failures are not critical in block 310, the process may continue.

In embodiment 300, the logic is configured so that the first indication of a failure may cause the process to exit and process the next replica. In block 312, the process may return to block 306 to process another replica. In other embodiments, the logic may be defined so that the process may continue with block 314 even when a failure has been detected.

In block 314, the application related processes may be analyzed to determine if any failures have occurred. If a failure has occurred in block 314, a timeout timer in block 316 may cycle the process back to block 314 until the timeout occurs. If the timeout occurs in block 316, a failure may be indicated in block 318.

If the application related processes are operational in block 314, the application may operate for a minimum time in block 320 to determine if the application is stable in block 322. If the application is not stable in block 322, the failure may be indicated in block 324. If the application is stable in block 322, the application replica may be identified as OK in block 326.

In some embodiments, the application may be exercised using a testing algorithm or other process in block 320. The testing algorithm may exercise the application replica to stress the replica and determine if the replica is stable or not.

Embodiment 300 illustrates an example of some of the information that may be provided by the application to a fabric controller as part of an update process. Other embodiments may use different mechanisms to determine the information provided by the application to the fabric controller.

Figure 4:
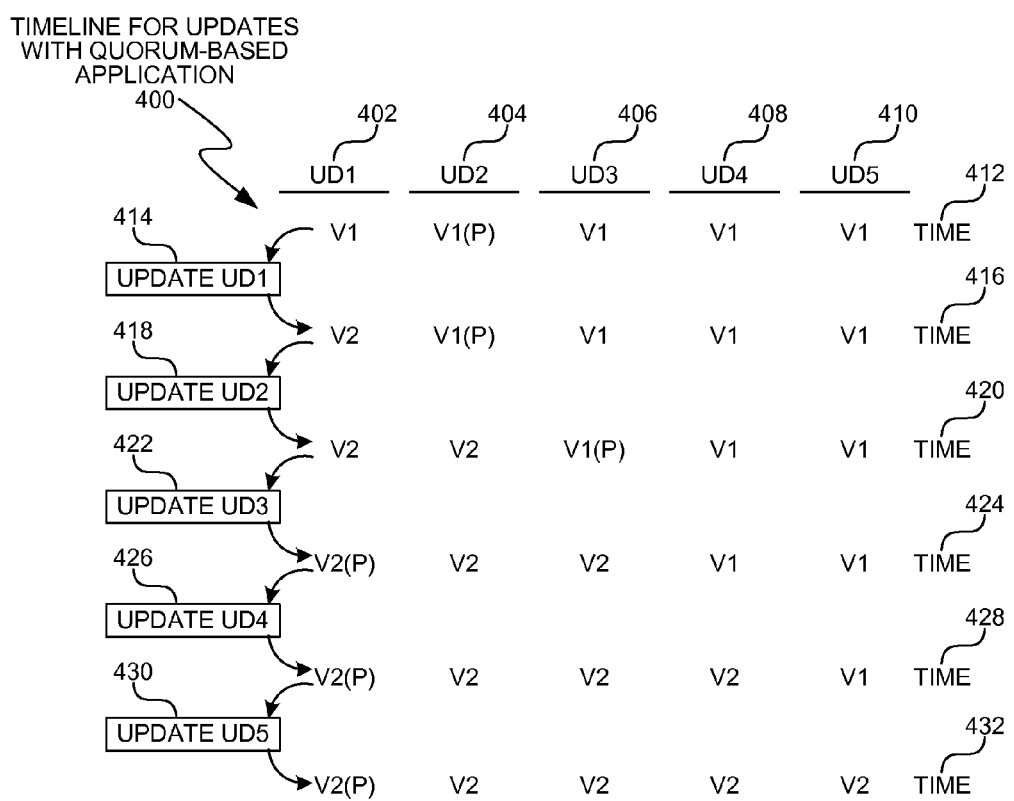
FIG. 4 is a diagram illustration of an embodiment showing an example sequence of updating performed on a quorum based distributed application.

FIG. 4 is a timeline diagram showing an example embodiment 400 showing a sequence of updates performed on different update domains. Embodiment 400 may illustrate a sequence of steps used in a quorum based application to determine which version of the application may have a quorum for responding to application requests.

In a quorum based application, two or more application processes may operate in parallel. After each application process completes a task, a quorum or 'vote' may be lodged for the correct answer to the task. The answer receiving the most votes may be determined to be correct.

In the example of embodiment 400, five different update domains are presented on the horizontal axis at the top of the diagram. These update domains are UD1 402, UD2 404, UD3 406, UD4 408, and UD5 410. The vertical axis may illustrate the state of the update domains and specifically the version of the update domains over time, with time advancing downward in the diagram.

At time 412, all of the update domains are shown as version 1, with UD2 having a "(P)" designator illustrating that UD2 is the primary. The primary designation may indicate that the update domain or a process within the update domain is the primary application replica.

An update operation may be performed in block 414 where UD1 is updated. At time 416, UD1 is updated to version 2 and the remaining update domains are at version 1.

An update operation may be performed in block 418, where UD2 is updated. At time 420, UD1 and UD2 are at version 2, while the remaining update domains are at version 1. Due to a quorum, the primary update domain may be changed from the UD2 to UD3, because the UD3 may be at version 1 and version 1 is the majority. During the update process to this point, the version 1 application replicas may be operating normally and responding to queries or performing other functions. Since the version 2 application replicas are in the minority, the version 2 application replicas may be operational but the results from the version 2 application replicas may be discarded.

Another update operation may be performed at block 422, where UD3 is updated. At time 424, UD1, UD2, and UD3 are at version 2, while UD4 and UD5 are at version 1. At time 424, the version 2 application replicas are in the majority and may then begin to generate results that are considered valid. Because version 2 is now the majority, UD1 may be selected as the primary.

A fourth update operation may be performed at block 426, where UD4 is updated. At time 428, all of the update domains are at version 2, with UD5 remaining at version 1.

A final update operation may be performed at block 430, where UD5 is updated. At time 432, all of the update domains are all version 2.

The sequence of steps illustrated in embodiment 400 illustrate how an update may be performed over several update domains and also how a quorum based application may determine when an updated version of the application may be considered valid.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on a plurality of computer processors, said method comprising:
   executing a distributed application on said plurality of computer processors, said distributed application being executed by a plurality of replicas of application code;
   said distributed application being executed on virtual machines having guest operating systems, said virtual machines being operated on host devices;
   grouping said plurality of replicas into update domains, said update domains being groups of said replicas;
   identifying an update to perform on said distributed application;
   querying the distributed application, by a fabric controller, to identify a sequence of said update domains to update;
   for each of said update domains, processing, by the fabric controller according to the sequence, a current update domain to perform said update, said processing comprising:
      querying said application executing in a current update domain, before transmission of said update for reception by said current update domain, to determine whether said application considers said current update domain ready for updating;
      after receiving a query response indicative of said current update domain being ready for updating, performing said update on said update domain;
      querying said application executing in said current update domain to determine if said update results in said application operating properly within said current update domain;
      when said update results in said application operating properly, proceeding to a next update domain; and
      when said update results in said application operating improperly, suspending said update.

2. The method of claim 1, said update comprising updating a version of said application.

3. The method of claim 2, said updating said version of said application comprising updating application executable code.

4. The method of claim 2, said updating said version of said application comprising updating configuration information for said application.

5. The method of claim 1, said update comprising updating said host.

6. The method of claim 1, said update comprising updating said guest operating system.

7. The method of claim 1, said grouping being performed by querying said distributed application for said grouping and receiving input on said grouping from said distributed application.

8. The method of claim 7, said querying being directed to a primary replica of said distributed application.

9. The method of claim 1 further comprising:
   determining a quorum from a plurality of said update domains, said quorum determining a current version of said distributed application.

10. The method of claim 9, said quorum being determined after each of said update domains are processed as said current domain.

11. The method of claim 10, said quorum defining a primary replica of said distributed application.

12. The method of claim 1, said update being performed in multiple update steps, each of said multiple update steps comprising processing each of said update domains in sequence.

13. The method of claim 12, said update comprising:
   performing a first update step comprising:
      querying said application executing in a current update domain to determine whether said current update domain is ready for updating; and
      if said application executing in said current update domain is not ready for updating, performing a repair on said application;
   performing a second update step comprising:
      performing an update to said application.

14. The method of claim 1, each of said update domains being updated atomically.

15. A cloud computing platform comprising:
   a plurality of host devices, each of said host devices comprising a processor;

for each of said host devices, at least one virtual machine having a guest operating system;
for each of said virtual machine, at least one replica of a distributed application, said distributed application comprising a plurality of said replicas;
a fabric controller that:
  determines a grouping for said replicas, said grouping defining a plurality of update domains, each of said update domains comprising a plurality of said replicas;
  queries the distribution application to determine a sequence of said update domains to update;
  processes each of said update domains according to said sequence by processing a current update domain in an atomic fashion, said current update domain being processed by a method comprising:
    querying said application executing in a current update domain, before transmission of said update for reception by said current update domain, to determine whether said application considers said current update domain ready for updating;
    after receiving a query response indicative of said current update domain being ready for updating, performing said update on said update domain;
    querying said application executing in said current update domain to determine if said update results in said application operating properly within said current update domain;
    when said update results in said application operating properly, proceeding to a next update domain; and
    when said update results in said application operating improperly, suspending said update.

16. The cloud computing platform of claim 15, said update comprising at least one of a group composed of:
  updating said host;
  updating said guest operating system;
  updating said virtual machine;
  updating configuration for said distributed application; and
  updating executable code for said distributed application.

17. The cloud computing platform of claim 16, said grouping of said replicas being determined by querying said distributed application to allow the distributed application to provide input to determine how to group said replicas.

18. The cloud computing platform of claim 17, wherein the distributed application is queried to allow the distributed application to provide input to determine how to sequence said update domains.

19. A method performed on a plurality of computer processors, said method comprising:
  executing a distributed application on said plurality of computer processors, said distributed application being executed by a plurality of replicas of application code;
  said distributed application being executed on virtual machines having guest operating systems, said virtual machines being operated on host devices;
  identifying an update to perform on said distributed application;
  transmitting information about said update to said distributed application to be considered by said distributed application in connection with responding to queries regarding said update;
  querying said distributed application to determine a grouping of said plurality of replicas into update domains for said update, said update domains being groups of said replicas;
  querying said distributed application, by a fabric controller, to determine a sequence of said update domains to update;
  for each of said update domains, processing, by the fabric controller according to the sequence, a current update domain to perform a first step of said update, said processing being performed as a first atomic operation and comprising:
    querying said application executing in a current update domain, before transmission of said update for reception by said current update domain, to determine whether said application considers said current update domain ready for updating; and
    if said application is not ready for updating, performing a repair on said application within said current update domain;
  for each of said update domains, processing a current update domain to perform a second step of said update, said processing being performed as a second atomic operation and comprising:
    after receiving a query response indicative of said current update domain being ready for updating, performing said update on said update domain;
    after performing said update, querying said application executing in a current update domain to determine whether said current update domain is operating properly;
    if said application is operating properly, completing said second step on said current update domain.

20. The method of claim 19, said update comprising implementing a topology change to said distributed application.

* * * * *